(12) United States Patent
Takatori

(10) Patent No.: US 9,065,644 B2
(45) Date of Patent: Jun. 23, 2015

(54) FULL DUPLEX TRANSMISSION METHOD FOR HIGH SPEED BACKPLANE SYSTEM

(75) Inventor: Hiroshi Takatori, Sacramento, CA (US)

(73) Assignee: Futurewei Technologies, Inc., Plano, TX (US)

( * ) Notice: Subject to any disclaimer, the term of this patent is extended or adjusted under 35 U.S.C. 154(b) by 234 days.

(21) Appl. No.: 13/525,544

(22) Filed: Jun. 18, 2012

(65) Prior Publication Data

US 2012/0327818 A1 Dec. 27, 2012

Related U.S. Application Data

(60) Provisional application No. 61/500,471, filed on Jun. 23, 2011.

(51) Int. Cl.
- *H04B 1/38* (2006.01)
- *H04Q 1/20* (2006.01)
- *H04L 5/14* (2006.01)

(52) U.S. Cl.
CPC .................................... *H04L 5/14* (2013.01)

(58) Field of Classification Search
USPC ............................ 370/219, 220, 277; 375/257
See application file for complete search history.

(56) References Cited

U.S. PATENT DOCUMENTS

| | | | |
|---|---|---|---|
| 4,639,910 A | 1/1987 | Toegel et al. | |
| 7,180,958 B2 * | 2/2007 | Bessios et al. | 375/286 |
| 7,756,197 B1 * | 7/2010 | Ferguson et al. | 375/224 |
| 8,386,887 B2 * | 2/2013 | Frost et al. | 714/767 |
| 8,588,254 B2 * | 11/2013 | Diab et al. | 370/477 |
| 2004/0193972 A1 * | 9/2004 | Mitlin et al. | 714/704 |
| 2005/0100083 A1 * | 5/2005 | Takatori et al. | 375/220 |
| 2009/0187778 A1 * | 7/2009 | Diab et al. | 713/322 |

FOREIGN PATENT DOCUMENTS

| | | |
|---|---|---|
| CN | 85107302 A | 7/1986 |
| WO | 2008106626 A1 | 9/2008 |

OTHER PUBLICATIONS

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, IEEE Standard 802.3-2008, Section 1, Dec. 26, 2008, pp. 1-597.

(Continued)

*Primary Examiner* — Edan Orgad
*Assistant Examiner* — Sithu Ko
(74) *Attorney, Agent, or Firm* — Conley Rose, P.C.; Grant Rodolph; Brandt D. Howell

(57) ABSTRACT

An integrated circuit (IC) for a backplane serializer/deserializer (SerDes) system, comprising a first transmitter configured to send first data at a data rate to a second receiver in a second IC, a first receiver configured to receive second data at the data rate from a second transmitter in the second IC, wherein each of a first link and a second link is to the first transmitter, the first receiver, the second transmitter, and the second receiver, and wherein both the first link and the second link combined are configured to transfer the first data from the first transmitter to the second receiver and transfer the second data from the second transmitter to the first receiver at the data rate.

20 Claims, 5 Drawing Sheets

(56) References Cited

OTHER PUBLICATIONS

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, IEEE Standard 802.3-2008, Section 2, 2008, pp. 1-790.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, IEEE Standard 802.3-2008, Section 3, 2008, pp. 1-315.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, IEEE Standard 802.3-2008, Section 4, 2008, pp. 1-586.

"Part 3: Carrier Sense Multiple Access with Collision Detection (CSMA/CD) Access Method and Physical Layer Specifications," IEEE Standard for Information Technology—Telecommunications and Information Exchange Between Systems—Local and Metropolitan Area Networks—Specific Requirements, IEEE Standard 802.3-2008, Section 5, 2008, pp. 1-615.

"Part 3: Carrier Sense Multiple Access with Collision Detection (CSMA/CD) Access Method and Physical Layer Specifications—Amendment 4: Ethernet Operation over Electrical Backplanes," IEEE Standard for Information Technology—Telecommunications and Information Exchange Between Systems—Local and Metropolitan Area Networks—Specific Requirements, IEEE Standard 802.3ap-2007, May 22, 2007, pp. 1-203.

"IEEE P802.3bj 100 Gb/s Backplane and Copper Cable Task Force," http://www.ieee802.org/3/bj/, downloaded from the Internet Jun. 7, 2012, 1 page.

Foreign Communication from a Counterpart Application, PCT Application PCT/CN2012/077424, English Translation of International Search Report, dated Nov. 8, 2012, 6 pages.

Foreign Communication From a Related Counterpart Application, PCT Application PCT/CN2012/077424, English Translation of Written Opinion dated Nov. 8, 2012, 5 pages.

\* cited by examiner

FULL DUPLEX TRANSMISSION METHOD FOR HIGH SPEED BACKPLANE SYSTEM

CROSS-REFERENCE TO RELATED APPLICATIONS

The present application claims the benefit of U.S. Provisional Patent Application No. 61/500,471 filed Jun. 23, 2011 by Hiroshi Takatori and entitled "Full Duplex Transmission Method for High Speed Backplane System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, more consumer products are intended for triple play telecommunications, e.g., voice, video, and data communications. To improve such communications, high-speed networks and components are being developed, such as switches and routers at the Internet infrastructure. High-speed backplane systems are one type of components that serve as backbone for the network physical layer. A backplane system may include line cards that use serializer/deserializer (SerDes) chipsets, such as SerDes application specific integrated circuits (ASICs). A SerDes is a pair of functional blocks commonly used in high-speed communications to compensate for limited input/output. The SerDes blocks convert data between serial data and parallel interfaces in both directions. The Institute of Electrical and Electronics Engineers (IEEE) standard 10 GBASE-KR 802.3ap defines a high-speed 40-inch multi-lane backplane system at a data rate of 10 gigabits per second (Gbps)/lane for supporting high-speed communications. However developing such backplane systems that have about 40 inches lane (or link) length between line cards and reliable 10 Gbps/lane data rates remains challenging due to stringent low noise requirements and other technical difficulties.

SUMMARY

In one embodiment, the disclosure includes an integrated circuit (IC) for a backplane SerDes system, comprising a first transmitter configured to send first data at a data rate to a second receiver in a second IC, a first receiver configured to receive second data at the data rate from a second transmitter in the second IC, wherein each of a first link and a second link is coupled to the first transmitter, the first receiver, the second transmitter, and the second receiver, and wherein both the first link and the second link combined are configured to transfer the first data from the first transmitter to the second receiver and transfer the second data from the second transmitter to the first receiver at the data rate.

In another embodiment, the disclosure includes a system for a backplane SerDes, comprising a first IC comprising a first transmitter and a first receiver, and a second IC comprising a second transmitter and a second receiver, wherein the first transmitter is coupled to each of a first link and a second link and configured to transmit first data at a data rate on a first channel supported by both the first link and the second link, wherein the second receiver is also coupled to each of the first link and the second link and configured to receive the first data on the first channel, wherein the second transmitter is also coupled to each of the first link and the second link and configured to transmit second data at the data rate on a second channel supported by both the first link and the second link, wherein the first receiver is also coupled to each of the first link and the second link and configured to receive the second data on the second channel, and wherein the first data and the second data are transmitted on the first link and the second link using two-bit pulse-amplitude modulation (PAM-4).

In yet another embodiment, the disclosure includes a method implemented by a backplane SerDes system in a network component, comprising transmitting, using PAM-4, one or more first symbols in a first channel of a full duplex transmission from a first transceiver on a first line card to a second transceiver at a second line card via a connector coupled to the first transceiver and the second transceiver, and receiving one or more second symbols transmitted using PAM-4 in a second channel of the full duplex transmission from the second transceiver to the first transceiver via the same connector.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
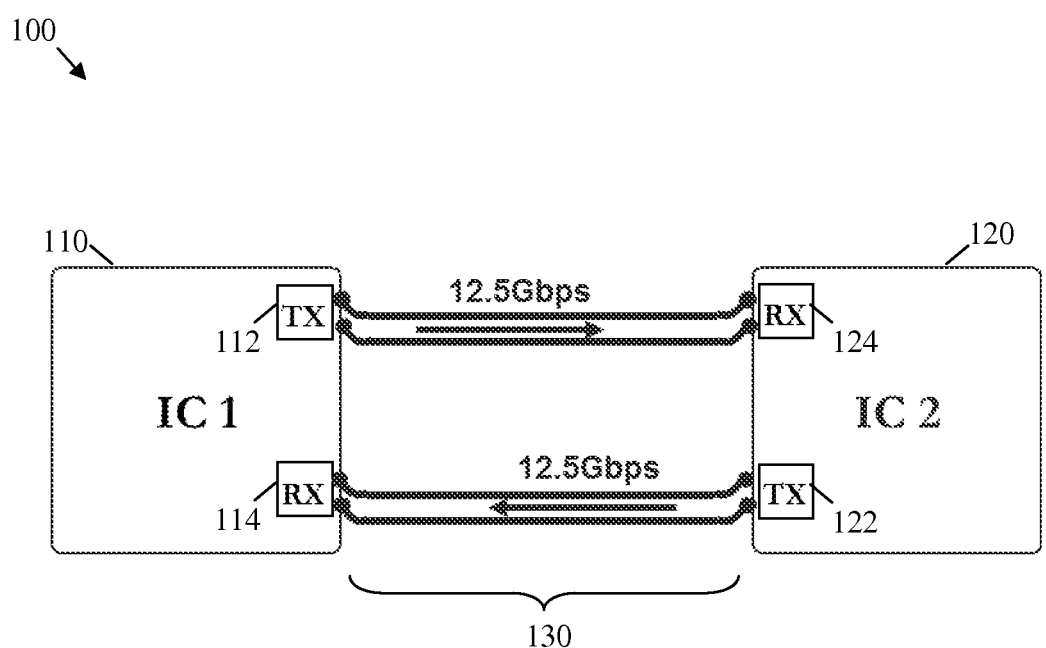
FIG. 1 is a schematic diagram of a typical backplane SerDes system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A backplane system may comprise a group of connectors that form a computer bus. The connectors may be connected in parallel with each other via a plurality of pins, where each pin of each connector may be coupled to a corresponding pin in each other connector. The backplane system may be used as a backbone to connect multiple line cards or printed circuit boards (PCBs) together, e.g., to establish a computer or processing system for network components. Other backplanes may be wire wrapped backplanes, which may be used in minicomputers and high reliability applications. A backplane system may also comprise a SerDes system that includes transmitters and receivers, which may be coupled via links (e.g., lanes or traces) on PCBs. To meet high-speed technology requirements, the IEEE and optical internetworking forum (OIF) define a high-speed multi-lane 40-inch backplane system, as described in IEEE 10 GBASE-KR 802.3ap standard, which is incorporated herein by reference. The backplane system may operate at a data rate of about 10 Gbps/link or more, which may pose challenges on the design of the backplane SerDes system.

In other communications systems, a full duplex transmission scheme has been used to increase data rates, such as in radio and telephone communications systems that have limited bandwidth per link. The full duplex transmission scheme, also referred to sometimes as double duplex transmission, may double the data throughput between system components by enabling communications in both directions at about the same time. The data throughput between two components may be substantially doubled by doubling the number of channels per link between the two components, e.g., without increasing the bandwidth or maximum allowed data rate per link. Specifically, each of the pair of channels on the link between the components may be dedicated to transmissions in one direction. A full duplex transmission scheme is defined in IEEE 1000 BASE-T 802.3ab standard for Ethernet gigabit communications, which is incorporated herein by reference.

Disclosed herein is a system and method for implementing the full duplex transmission for a backplane SerDes system. The system may comprise two ICs that may be coupled via one or more lanes or links, such as wires, buses, traces, any other suitable connectors. Each link may be shared by a transmitter and receiver pair on each end of the link. Each link may support a pair of bi-directional channels between a first transmitter and receiver pair on a first IC and a corresponding second transmitter and receiver pair on a second IC. The first transmitter and receiver pair, and similarly the corresponding second transmitter and receiver pair, may use up to the full allowed bandwidth on the link to communicate in each of the two directions between the two ICs.

The transmitter of the first pair on the first IC may transmit data at the link's maximum allowed bandwidth (or data rate) to the receiver of the second pair on the second IC. The receiver of the first pair on the first IC may also receive data at the link's maximum allowed bandwidth (or data rate) from the transmitter of the second pair on the second IC. The first and second pairs of transmitters and receivers on the two ICs may also transmit the data simultaneously or at about the same time in opposite directions. The backplane SerDes system may be a 40-inch multi-lane backplane system, e.g., as described in IEEE 10 GBASE-KR 802.3ap, and may use the full duplex transmission scheme to transmit data, e.g., as described in IEEE 1000 BASE-T 802.3ab, at a rate of about 10 Gbps/lane or more.

FIG. 1 illustrates a typical backplane SerDes system 100. The backplane SerDes system 100 may be used as a backbone for the physical layer in current networks, e.g., in network nodes or servers, and may provide gigabit data rates. However, the backplane SerDes system 100 may not have sufficiently low bit error rate (BER) that meet the requirements of a 40-inch multi-lane backplane system, e.g., as defined by IEEE 10 GBASE-KR 802.3ap. The backplane SerDes system may comprise a first IC 110 (IC1) that comprises a first transmitter (TX) 112 and a first receiver (RX) 114, a second IC 120 (IC2) that comprises a second transmitter (TX) 122 and a second receiver 124 (RX), and about two pairs of links 130 (e.g., each pair of links comprising two single lanes, wires, or traces) that couple the first IC 110 to the second IC 120.

The first IC 110 and the second IC 120 may be any circuit cards or PCBs, such as ASICs that process data. Each pair of the links 130 between the first IC 110 and the second IC 120 may correspond to twisted pair wires or any other type of differential pair connectors. The two links in each pair of links 130 may be differentially biased to transmit electrical signals on the pair of links 130 (e.g. via a first channel in one direction and via a second channel in an opposite direction). The first transmitter 112 at the first IC 110 may be coupled to the second receiver 124 at the second IC 120 via a first pair of links 130 (e.g., twisted pair wires). The first receiver 114 may be coupled to the second transmitter 122 via a similar second pair of links 130. Each pair of links 130 may support about the same bandwidth and hence allow about the same transmitted data rates between the corresponding components. For example, the first pair of links 130 may allow the first transmitter 112 to transmit data at about 12.5 Gbps to the second receiver 124. Similarly, the second pair of links 130 may allow the first receiver 114 to receive data at about 12.5 Gbps from the second transmitter 122.

Although, the backplane SerDes system 100 may be capable of providing Gigabit data rates (above 10 Gbps) on each pair of links 130 between corresponding pairs of transmitters and receivers, this design may not meet the BER requirements for a 40-inch multi-lane backplane system, such as defined in 10 GBASE-KR 802.3ap. The BER requirements for the 40-inch multi-lane backplane system that provides about 10 Gbps/lane or more may allow a maximum margin of about 4.4 decibel (dB). The pair of links 130 between the ICs in the 40-inch multi-lane backplane system may be about 40 inches long, where at such distances the crosstalk (or interference) noise and hence the BER in the transferred signals on adjacent pairs of links 130 may become significantly high. The relatively high noise may be associated with the relatively limited signal bands that may be used for transmissions. For such relatively high levels of noise or errors, the data rates (e.g., 12.5 Gbps) per link in the SerDes system 100 may not be sufficient to meet the BER requirements for the 40-inch multi-lane backplane system. Some error corrections schemes have been proposed to reduce the resulting BER but may require some level of difficulty in implementation, increase in cost, and/or increase in data transfer latency. Thus, an improved design that increases the link bandwidth may be needed.

Figure 2:
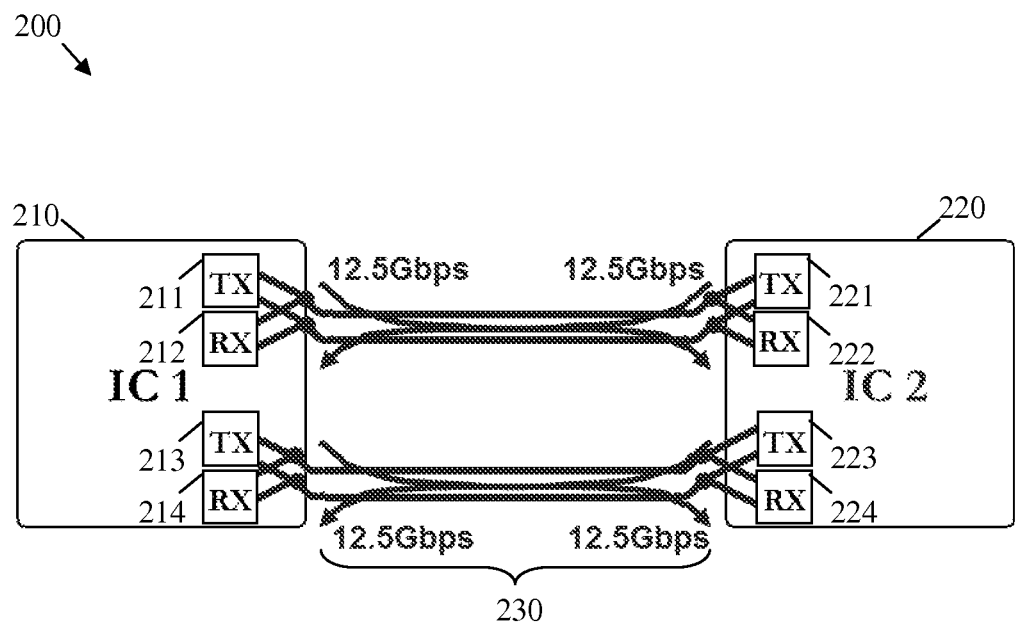
FIG. 2 is a schematic diagram of an embodiment of a full duplex backplane SerDes system.

FIG. 2 illustrates an embodiment of a full duplex backplane SerDes system 200, which may have higher data rates per link in comparison to the backplane SerDes system 100. The increase in data rates per link may allow the backplane SerDes system 200 to meet the BER requirements for 40-inch multi-lane backplane systems, e.g., at a maximum BER margin of about 4.4 dB for 10 Gbps or more data rates according to 10 GBASE-KR 802.3ap. The full duplex backplane SerDes system 200 may use the full duplex transmission scheme, e.g., as described in 1000 BASE-T 802.3ab, to double the data throughput per link in comparison the per-link data rates of the backplane SerDes system 100. The backplane SerDes system 200 may comprise a first IC 210 (IC1), a second IC 220 (IC2), and about four links 230 (e.g., lanes, wires, or traces) that couple the first IC 210 to the second IC 220, as shown in FIG. 2. The first IC 210 may comprise a first transmitter 211, a first receiver 212, a second transmitter 213, and a second receiver 214. The second IC 220 may comprise a third transmitter 221, a third receiver 222, a fourth transmitter 223, and a fourth receiver 224.

The first IC 210 and the second IC 220 may be any circuit cards or PCBs, such as ASICs that process data. Each pair of links 230 between the first IC 210 and the second IC 220 may correspond to twisted pair wires or any other type of differential pair connectors. The first transmitter 211 and first receiver 212 at the first IC 210 may be coupled to the third transmitter 221 and third receiver 222 at the second IC 220 via a first pair of links 230 (e.g., twisted pair wires). The second transmitter 213 and second receiver 214 at the first IC 210 may be coupled to the fourth transmitter 223 and fourth receiver 224 via a similar second pair of links 230. Each pair of links 130 may support two unidirectional channels, e.g., a first channel for transmitting signals in the direction from the first IC 210 to the second IC 220, and a second channel for transmitting signals in the opposite direction from the second IC 220 to the first IC 210. For instance, the first pair of links 230 (e.g., twisted pair wires) may be differentially biased at the first IC 210 to transmit the signals on the first channel (in a first direction). The same first pair of links 230 may also be electrically biased in a differential manner at the second IC 220 to transmit the signals on the second channel (in a second direction).

The pairs of links 230 may have about the same bandwidth and hence allow about the same transmitted data rates between the corresponding components. Based on the full duplex transmission scheme, each link 230 (in a pair of links 230) may share a transmitter and receiver pair on each link end. Each link 230 (in a pair of links 230) may enable two bi-directional channels for transferring data in the two opposite directions between the first IC 210 and second IC 220 at about the same data rate. To enable using the full duplex transmission scheme, each of the two links 230 (in the first pair of links 230) may be coupled to both the first transmitter 211 and first receiver 212 at the first IC 210 and both the third transmitter 221 and third receiver 222 at the second IC 220, as shown in FIG. 2. As such, the two links 230 (in the first pair of links 230) may allow the first transmitter 211 to transmit data at about 12.5 Gbps (or any other gigabit rate) to the third receiver 222, which may be the maximum allowed data rate per link. This transferred data in the direction from the first IC 210 to the second IC 220 may correspond to a first channel on the first pair of links 230 that uses about the maximum allowed bandwidth on the first pair of links 230. The two links 230 (in the first pair of links 230) may also allow the first receiver 212 to receive data at about 12.5 Gbps, for example, from the third transmitter 221. This transferred data in the direction from the second IC 220 to the first IC 210 may correspond to a second channel on the first pair of links 230 that may also use about the maximum allowed bandwidth on the first pair of links 230. The data may be transferred in opposite directions on the two channels of the first pair of links 230 at about the same time.

Similarly, each of the two links 230 (in the second pair of links 230) may be coupled to both the second transmitter 213 and second receiver 214 at the first IC 210 and both the fourth transmitter 223 and fourth receiver 224 at the second IC 220, as shown in FIG. 2. As such, the two links 230 (in the second pair of links 230) may allow the second transmitter 213 to transmit data at about 12.5 Gbps (or any other gigabit rate) to the fourth receiver 224, which may be the maximum allowed data rate per link. This transferred data in the direction from the first IC 210 to the second IC 220 may correspond to a first channel on the second pair of links 230 that uses about the maximum allowed bandwidth on the second pair of links 230. The two links 230 (in the second pair of links 230) may also allow the second receiver 214 to receive data at about 12.5 Gbps, for example, from the fourth transmitter 223. This transferred data in the direction from the second IC 220 to the first IC 210 may correspond to a second channel on the second pair of links 230 that may also use about the maximum allowed bandwidth on the second pair of links 230. The data may be transferred in opposite directions on the two channels of the second pair of links 230 at about the same time.

The full duplex backplane SerDes system 200 may use any standard or known full duplex circuit for transmitting and receiving data using two channels on the link. For instance, each pair of transmitters and receivers in the first IC 210 and similarly the second IC 220 may be implemented using an integrated transceiver circuit or using separate transmitter and receiver circuits. The first IC 210 and second IC 220 may be any PCBs fabricated using typical material and processes, e.g., similar to the first IC 110 and second IC 120. In different embodiments, the first IC 210 and second IC 220 or the corresponding pairs of transmitters and receivers that are coupled to each other via the links 230 may be located on the same line cards or PCBs or on different line cards or PCBs.

As described above, using the full duplex transmission scheme may enable doubling the data throughput per link (the overall data rate in both directions) without changing the signaling bandwidth (or the maximum allowed data rate) per link. The scheme may double the data throughput per link, which may be about 6 Gbps, about 10 Gbps, about 12.5 Gbps, about 20 Gbps, about 25 Gbps, or any other rate depending on the design and components used for the backplane SerDes system. Increasing the data throughput may also increase the lifetime of the system since doing so may extend the system's usefulness over longer time in the future (where demand for higher speed applications is expected). Increasing the lifetime of the system is attractive in terms of reducing cost on system upgrades. Typically, the lifetime of the system operating at about 6 Gbps or about 10 Gbps is expected to be up to about three years. Doubling throughput for such data rates is expected also to double the corresponding lifetime.

Additionally, the number of levels for line code may be increased for each channel on the link. This may be achieved using more bits per symbol during data modulation. For instance, the full duplex backplane SerDes system 200 may implement PAM-4 instead of one-bit pulse-amplitude modulation (PAM-2) to signal about twice the amount of data (during the same time window) per channel on the link. Increasing the number of signaled bits per symbol may further increase the data throughput per link when combined with the full duplex transmission scheme. Alternatively, the number of bits per symbol may be increased and the transmission data rate per channel may be decreased to maintain about the same data throughput. Reducing the data rate or speed per channel or link may reduce the amount of noise and crosstalk and hence improve signal quality, such as for critical applications that require more data integrity. For example, the full duplex transmission scheme and PAM-4 (instead of PAM-2) modulation may be used per link to reduce the data rate on each channel (in both directions) from about 12.5 Gbps to about 6.25 Gbps without reducing the data throughput (the amount of communicated data during the same time window). Reducing the data rate from about 12.5 Gbps to about 6.25 Gbps may substantially reduce the BER per channel.

Figure 3:
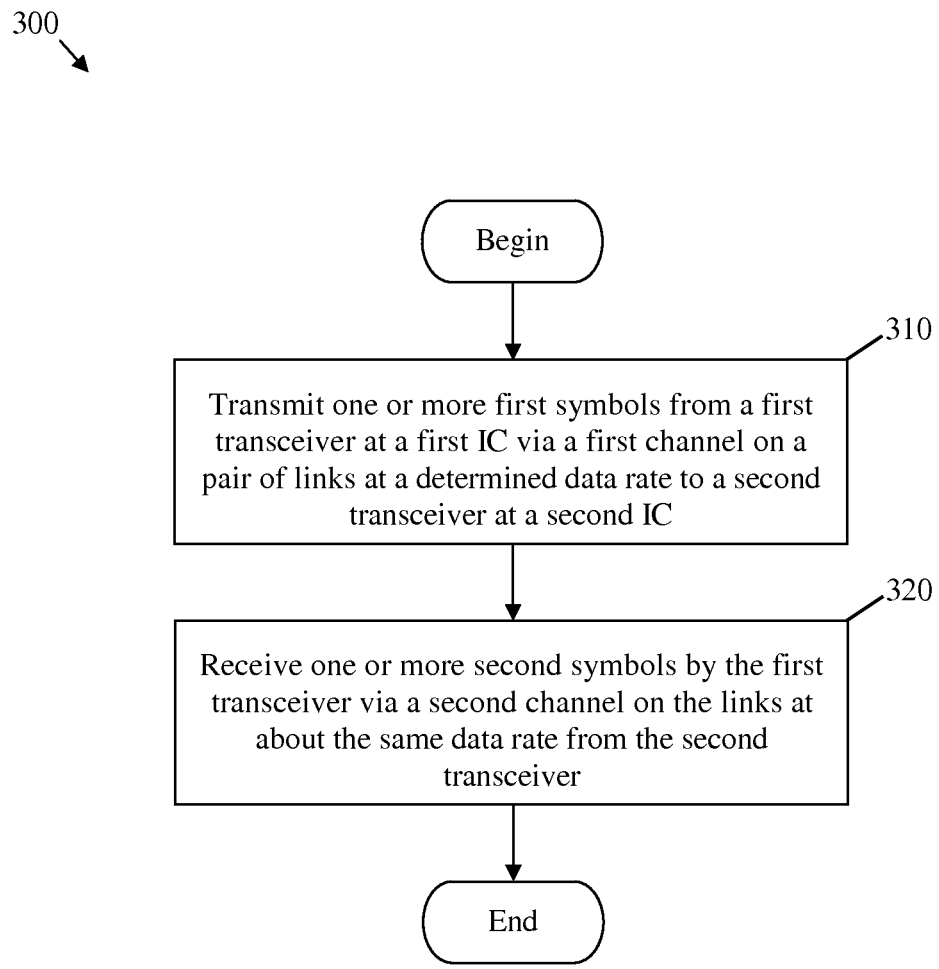
FIG. 3 is a schematic diagram of an embodiment of a backplane full duplex transmission method.

FIG. 3 illustrates an embodiment of a backplane full duplex transmission method 300, which may be used in a backplane SerDes system that implements the full duplex transmission scheme, such as the full duplex backplane SerDes system 200. The method 300 may be implemented by a transmitter and receiver circuit or a transceiver circuit on an IC in a backplane SerDes system. The IC may be coupled to and configured to communicate with a corresponding IC on the backplane SerDes system via a pair of dedicated links (e.g., lanes or traces) between the two ICs. The links may have a length of about 40 inches and support Gigabit data rates, e.g., at about 10 Gbps or more, in accordance with the specifications of 10 GBASE-KR 802.3ap.

The method 300 may begin at block 310, where one or more first symbols may be transmitted from a first transceiver at a first IC via a first channel on a pair of links at a determined data rate to a second transceiver at a second IC. The links may comprise a differential pair of connectors (e.g., a pair of wires) that are both shared by the transmitting and receiving components of the transceivers on both ends of the links. The transceiver may be an integrated circuit configured to transmit and receive signals or one or more circuits that includes a transmitter and a separate receiver. For example, the first transmitter 211 may transmit the data symbols via a first channel on the first pair of links 230 to the third receiver 222. The maximum allowed data rate may be about 10 Gbps or about 12.5 Gbps. At block 320, one or more second symbols may be received by the first transceiver via a second channel on the links at about the same data rate from the second transceiver. For example, the first receiver 212 may receive the data symbols via a second channel on the first pair of links 230 from the third transmitter 221. The first symbols and the second symbols may be exchanged at blocks 310 and 320 between the first transceiver and the second transceiver at about the same time or at different times. The method 300 may then end.

Figure 4:
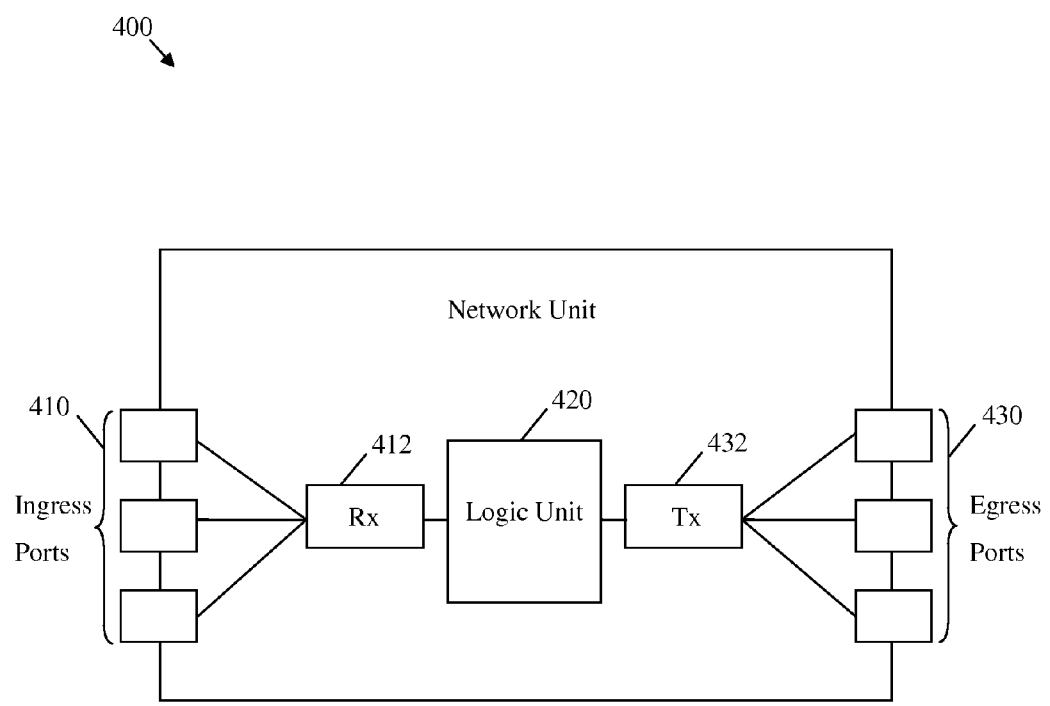
FIG. 4 is a schematic diagram of an embodiment of a network unit.

FIG. 4 illustrates an embodiment of a network unit 400, which may be any device that transports and processes data in a network, such as a switch, a router, or other network nodes. The network unit 400 may comprise a backplane SerDes system as defined in 10 GBASE-KR 802.3ap, such as the full duplex backplane SerDes system 200, that serves as the backbone for physical layer communications. The network unit 400 may comprise one or more ingress ports or units 410 coupled to a receiver (Rx) 412 for receiving signals and frames/data from other network components. The network unit 400 may comprise a logic unit 420 to determine to which network components to send the packets. The logic unit 420 may be implemented using hardware, software, or both. The logic unit 420 may comprise the backplane SerDes system of the network unit 400, which may implement the backplane full duplex transmission method 300. The network unit 400 may also comprise one or more egress ports or units 430 coupled to a transmitter (Tx) 432 for transmitting signals and frames/data to the other network components. The components of the network unit 400 may be arranged as shown in FIG. 4.

Figure 5:
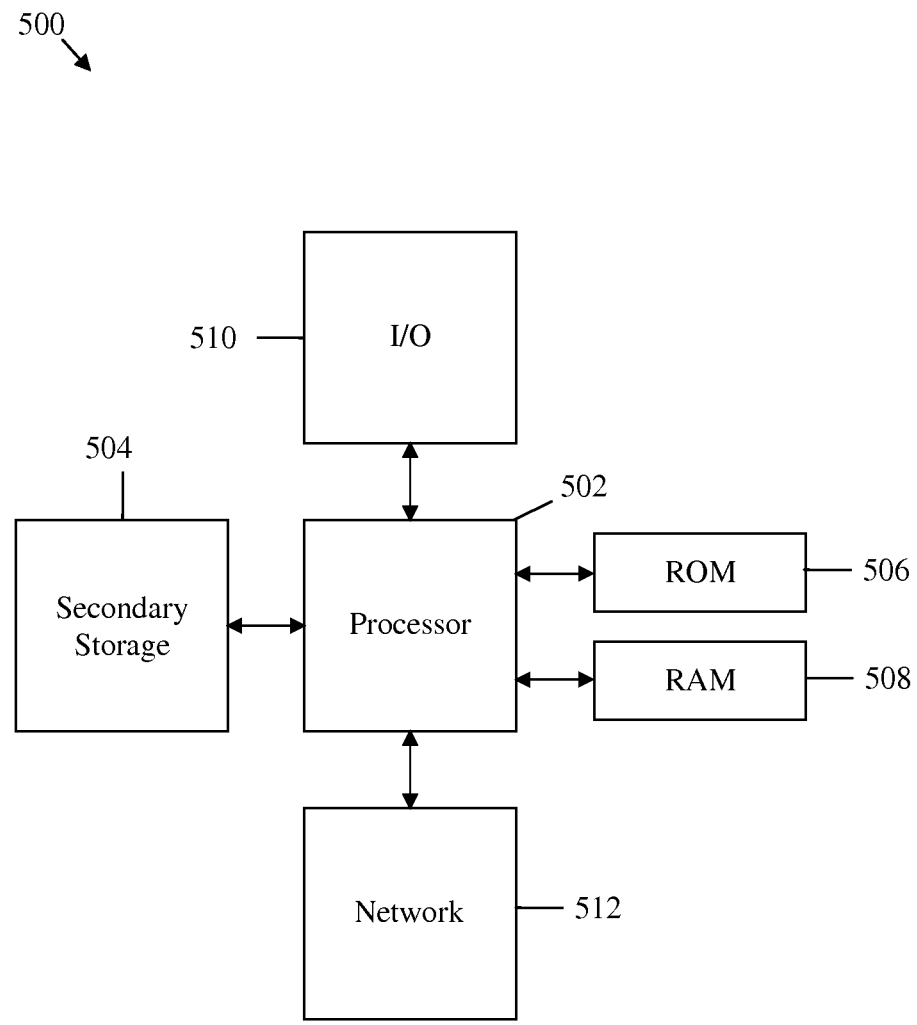
FIG. 5 is a schematic diagram of an embodiment of a general-purpose computer system.

FIG. 5 illustrates a typical, general-purpose network component 500 that may correspond to or may be part of a network component, such as a server, a switch, a router, or any other network nodes. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The general-purpose network component 500 may also comprise, at the processor 502 and or any of the other components of the general-purpose network component 500, a backplane SerDes system as defined in 10 GBASE-KR 802.3ap, such as the full duplex backplane SerDes system 200.

The processor 502 may be implemented as one or more CPU chips, or may be part of one or more ASICs. The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An integrated circuit (IC) for a backplane serializer/deserializer (SerDes) system, comprising:
a first transmitter configured to send first data at a data rate to a second receiver in a second IC;
a first receiver configured to receive second data at the data rate from a second transmitter in the second IC;
wherein a first link is coupled to the first transmitter, the first receiver, the second transmitter, and the second receiver to form a first bidirectional link,
wherein a second link is coupled to the first transmitter, the first receiver, the second transmitter, and the second receiver to form a second bidirectional link,
wherein both the first link and the second link combined are configured to transfer the first data from the first transmitter to the second receiver and transfer the second data from the second transmitter to the first receiver at the data rate, and
wherein the IC is configured to transfer the first data and the second data in full duplex mode by employing two-bit pulse-amplitude modulation (PAM-4) to reduce link speed of the first link and the second link without reducing throughput of a lane pair comprising the first link and the second link.

2. The IC of claim 1 further comprising:
a third transmitter configured to send and receive third data at the data rate to a fourth receiver in the second IC;
a third receiver configured to receive fourth data at the data rate from a fourth transmitter in the second IC;
a third link coupled to the third transmitter, the third receiver, the fourth transmitter, and the fourth receiver to form a third bidirectional link; and
a fourth link coupled to the third transmitter, the third receiver, the fourth transmitter, and the fourth receiver to form a fourth bidirectional link,
wherein the third link and the fourth link are each configured to transfer the third data from the third transmitter to the fourth receiver and transfer the fourth data from the fourth transmitter to the third receiver at the data rate.

3. The IC of claim 2, wherein the first link, the second link, the third link, and the fourth link each have a length of 40 inches between the first-IC and the second IC.

4. The IC of claim 2, wherein the third data and the fourth data are modulated using PAM-4.

5. The IC of claim 1, wherein the backplane SerDes system is a 40-inch multi-lane backplane system defined in the Institute of Electrical and Electronics Engineers (IEEE) 10GBASE-KR 802.3ap standard.

6. The IC of claim 1, wherein the backplane SerDes system has a bit error rate (BER) margin requirement of four decibels (dB).

7. The IC of claim 1, wherein the data rate in the first link and the second link is equal to 6 gigabit per second (Gbps), 10 Gbps, 12.5 Gbps, 20 Gbps, or 25 Gbps.

8. The IC of claim 1, wherein the IC and the second IC are SerDes application specific integrated circuits (ASICs).

9. A system for a backplane serializer/deserializer (SerDes), comprising:

a first integrated circuit (IC) comprising a first transmitter and a first receiver; and
a second IC comprising a second transmitter and a second receiver,
wherein the first transmitter is coupled to each of a first link and a second link and configured to transmit first data at a data rate on a first channel supported by both the first link and the second link,
wherein the second receiver is also coupled to each of the first link and the second link and configured to receive the first data on the first channel,
wherein the second transmitter is also coupled to each of the first link and the second link and configured to transmit second data at the data rate on a second channel supported by both the first link and the second link,
wherein the first receiver is also coupled to each of the first link and the second link and configured to receive the second data on the second channel,
wherein both the first link and the second link are bidirectional links by coupling both the first link and the second link to the first transmitter, first receiver, the second transmitter, and the second receiver, and
wherein the backplane SerDes is configured to transfer the first data and the second data in full duplex mode by employing two-bit pulse-amplitude modulation (PAM-4) to reduce link speed of the first link and the second link without reducing throughput of a lane pair comprising the first link and the second link.

10. The system of claim 9, wherein the first link and the second link each has a length of 40 inches.

11. The system of claim 9, wherein the first data is transmitted on the first channel and the second data is transmitted on the second channel simultaneously.

12. The system of claim 9, wherein the full duplex mode is a full duplex transmission scheme as defined in the Institute of Electrical and Electronics Engineers (IEEE) 1000BASE-T 802.3ab standard.

13. The system of claim 12, wherein the full duplex transmission scheme increases data throughput on the first link and the second link without increasing bandwidth on the first link and the second link.

14. The system of claim 9, wherein PAM-4 increases a data throughput rate by increasing a number of signaled bits per symbol by two in comparison to using one-bit pulse-amplitude modulation (PAM-2).

15. The system of claim 9, wherein the first data and the second data are transmitted using PAM-4 at a data rate below an allowed data rate on the first link and the second link to reduce the data bit error rate (BER) without reducing data throughput on the first link and the second link.

16. The system of claim 15, wherein PAM-4 reduces the BER without reducing the data throughput by increasing a number of bits per symbol and decreasing the data rate to maintain the data throughput.

17. A method implemented by a backplane serializer/deserializer (SerDes) system in a network component, comprising:
transmitting, using two-bit pulse-amplitude modulation (PAM-4), one or more first symbols in a first channel of a full duplex transmission from a first transmitter on a first line card to a second receiver at a second line card via a pair of connectors coupled to the first transmitter and the second transmitter; and
receiving one or more second symbols transmitted using PAM-4 in a second channel of the full duplex transmission from a second transmitter to the first receiver via the same pair of connectors, wherein the pair of connectors is a differential pair of connectors comprising a first link and a second link, wherein both the first link and the second link are coupled to the first transmitter, the first receiver, the second transmitter, and the second receiver to form a plurality of bidirectional links, and wherein the backplane SerDes system is configured to transfer the first symbols and the second symbols in full duplex mode by employing PAM-4 to reduce link speed of the first link and the second link without reducing throughput of the pair of connectors.

18. The method of claim 17, wherein the one or more first symbols and the one or more second symbols are transmitted at least 10 gigabits per second (Gbps), and wherein the connector is a twisted pair of wires.

19. The method of claim 17, wherein using PAM-4 increases a data throughput rate by increasing a number of signaled bits per symbol by two in comparison to using one-bit pulse-amplitude modulation (PAM-2).

20. The IC of claim 1, wherein the first data and the second data are modulated using one bit pulse-amplitude modulation (PAM-2).

* * * * *